E. O. BRINCKERHOFF.
Range.

No. 159,298. Patented Feb. 2, 1875.

WITNESSES: INVENTOR:
Edwin O. Brinckerhoff
BY
ATTORNEYS.

E. O. BRINCKERHOFF.
Range.

No. 159,298.

4 Sheets--Sheet 2.

Patented Feb. 2, 1875.

WITNESSES:
A. W. Almquist
A. F. Terry

INVENTOR:
Edwin O. Brinckerhoff
BY
ATTORNEYS.

E. O. BRINCKERHOFF.
Range.

No. 159,298.

4 Sheets--Sheet 3.

Patented Feb. 2, 1875.

WITNESSES:
A. W. Almquist
A. F. Terry

INVENTOR:
Edwin O. Brinckerhoff
BY
Munn
ATTORNEYS.

4 Sheets--Sheet 4.

E. O. BRINCKERHOFF.
Range.

No. 159,298.

Patented Feb. 2, 1875.

WITNESSES:

INVENTOR:
Edwin O. Brinckerhoff
BY
ATTORNEYS.

UNITED STATES PATENT OFFICE.

EDWIN O. BRINCKERHOFF, OF NEW YORK, N. Y.

IMPROVEMENT IN RANGES.

Specification forming part of Letters Patent No. 159,298, dated February 2, 1875; application filed January 11, 1875.

*To all whom it may concern:*

Figure 1:
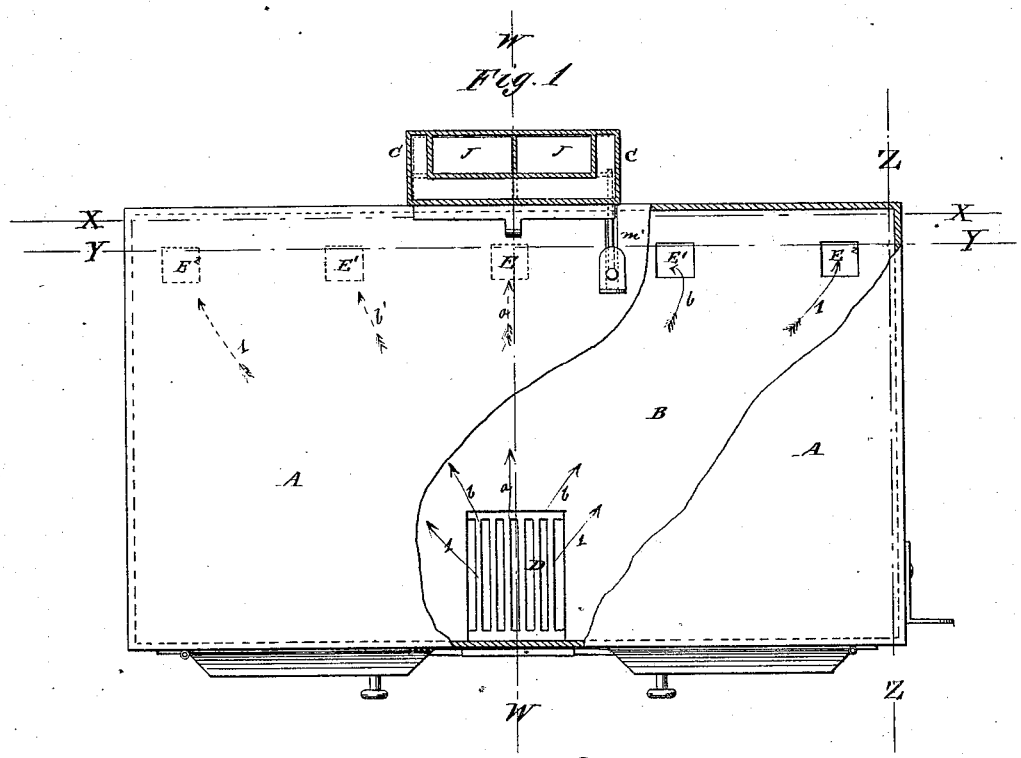
Figure 2:
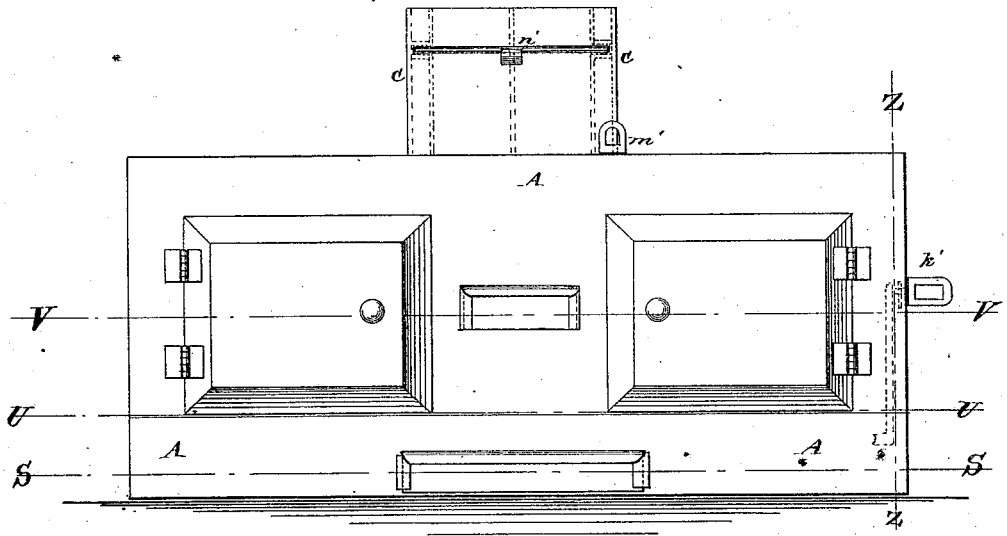
Figure 3:
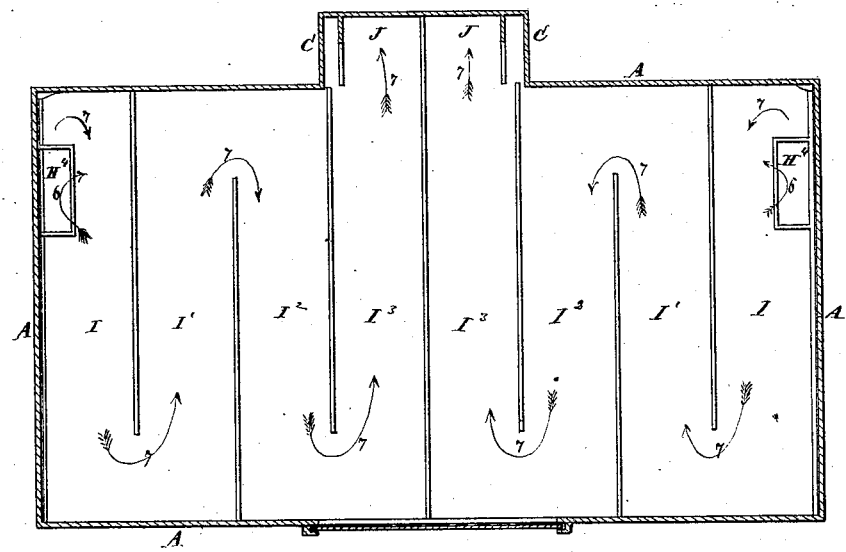
Figure 4:
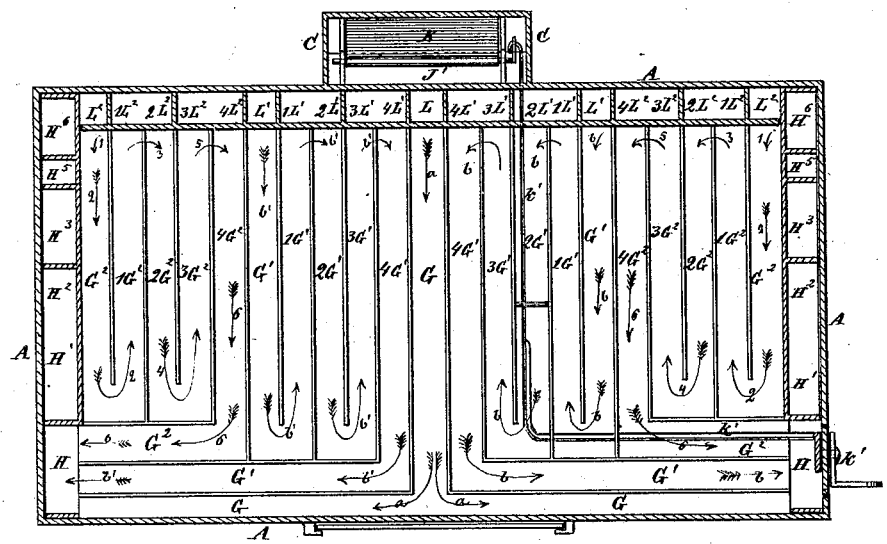
Figure 5:
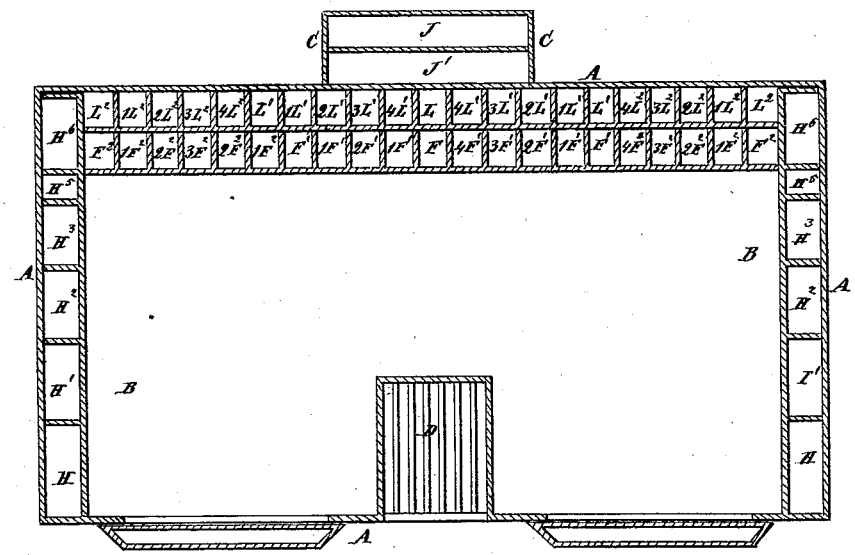
Figure 6:
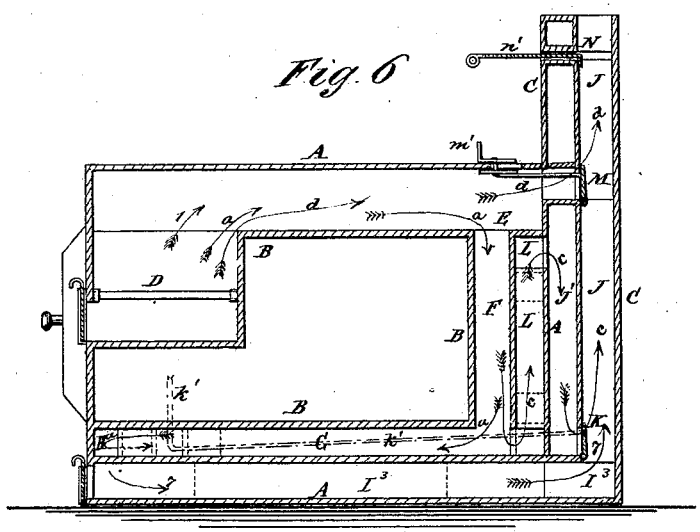
Figure 7:
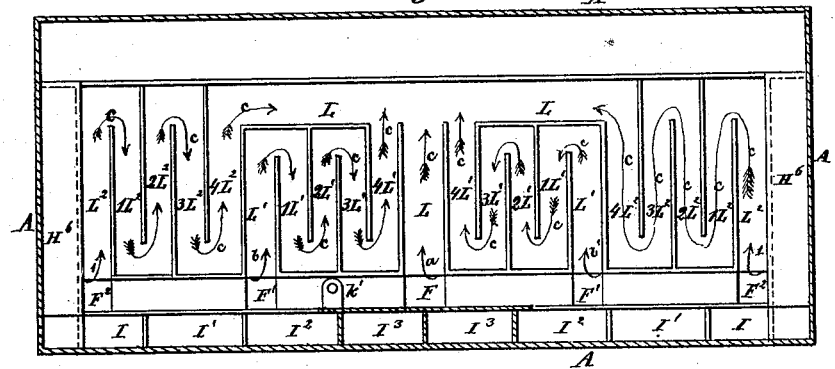
Figure 8:
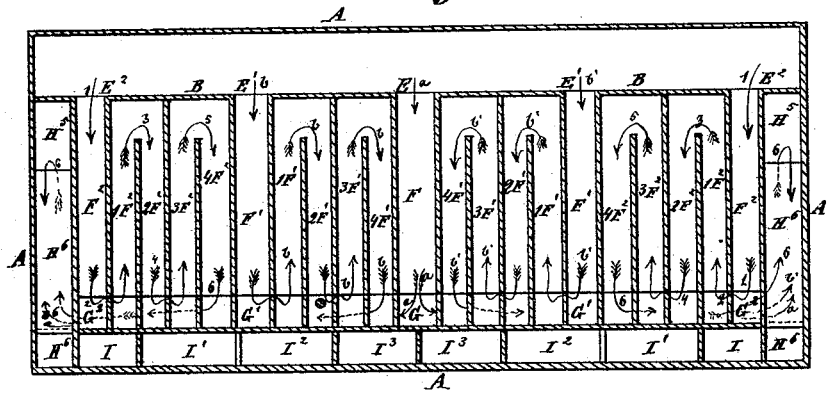
Figure 9:
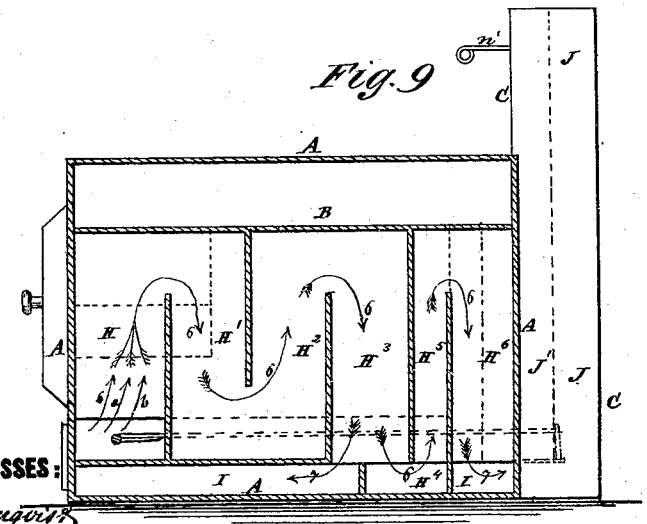

Be it known that I, EDWIN O. BRINCKERHOFF, of New York city, in the county and State of New York, have invented a new and useful Improvement in Range, of which the following is a specification:

Figure 1 is a top view of my improved range, part of the top plate being broken away. Fig. 2 is a front view of the same. Fig. 3 is a horizontal section of the same taken through the line $s\,s$, Fig. 2. Fig. 4 is a horizontal section of the same taken through the line U U, Fig. 2. Fig. 5 is a horizontal section of the same taken through the line V V, Fig. 2. Fig. 6 is a vertical section of the same taken through the line W W, Fig. 1. Fig. 7 is a vertical section of the same taken through the line X X, Fig. 1. Fig. 8 is a vertical section of the same taken through the line Y Y, Fig. 1. Fig. 9 is a vertical section of the same taken through the line Z Z, Figs. 1 and 2.

Similar letters of reference indicate corresponding parts.

My invention has for its object to furnish an improved range the flues of which shall be so arranged that it may be thoroughly and uniformly heated for baking purpose, that it may be used for boiling purposes without being wholly heated, may have a strong draft, and may be easily manipulated to control the heat.

The invention consists in the combination of the forward rear flues, the upper bottom flues, the side flues, and the lower bottom flues with each other and with the cases or shells of a range and the chimney-flue; in the combination of the damper with the two sets of flues and the rear chimney-flue; and in the combination of the damper with the rear chimney-flue, the two sets of flues, and the opening leading into the space between the top-plates of the cases or shells of the range, as hereinafter fully described.

A is the outer case or shell of the range. B is the inner case or shell that incloses the oven, and C is the chimney-flue. Spaces are left between the top, bottom, side, and rear plates of the two shells A B, for the formation of flues for the passage of the products of combustion. The space between the rear plates of the two shells A B is divided into two flue-spaces by a vertical division-plate, as shown in Figs. 5 and 6. The space between the bottom plates of the two shells A B is divided into two flue-spaces by a horizontal plate, as shown in Figs. 6, 7, and 8. The lower part of the chimney-flue is divided into two flues by a vertical plate placed parallel with the rear plates of the shells A B, as shown in Figs. 4, 5, and 6, and in dotted lines in Fig. 9. The part of the chimney-flue above the top plate of the shell A is provided with double walls upon its front and sides, inclosing air-chambers, to prevent the radiation of heat.

I will describe the various flues in connection with the course of the products of combustion as they pass through them.

D is the fire-chamber, which is formed in the upper front part of the range, and opens directly into the space between the top plates of the shells A B. In the rear part of the top plate of the shell B, which projects over the two rear flue-spaces, are formed five holes, $E^2$ $E^1$ E $E^1$ $E^2$, leading into the forward rear flue-space. The sum of the areas of the five holes E, and also of the five flues that lead from them, is equal to the area of the chimney-flue, and generally the sum of the areas through which the products of combustion are passing at any given part of their passage is always equal to the area of the chimney-flue. From the five holes E the products of combustion pass down through the five flues $F^2$ $F^1$ F $F^1$ $F^2$ in the forward rear flue-space, and thence into the five flues $G^2$ $G^1$ G $G^1$ $G^2$ in the upper bottom flue-space. At the front of the said upper bottom space the products of combustion passing through the flue G divide and pass through the lateral flues G to the flues H in the side flue-spaces. The products of combustion that pass through the flues $G^1$ return through the flues $1G^1$ into the flues $1F^1$, and return through the flues $2F^1$ and $2G^1$, and pass through the lateral flues $G^1$ into the side flues H. The products of combustion that pass through the flues $G^2$ return through the flues $1G^2$ into the flues $1F^2$, return through the flues $2F^2$ and $2G^2$, and pass through the lateral flues $G^2$ into the side flues H. The course of the products of combustion from the fire-box D to the side flues H is indicated by the arrows $a\,b$ and 1 to 6. The products of combustion are again united in the side flues H. In the side flue-spaces the products of combustion pass up through the flue H, down through the flue H¹, up through the flue H², down through the flue H³, at the bottom of which they divide, part passing into the flue I of the lower bottom flue-space, and part passing through the flue H⁴ into the flue H⁵, up which it passes, and then passes down into the flue I. The united products of combustion pass forward through the flues I, back through the flues I¹, forward through the flues I², back through the flues I³, into the rear chimney-flue J. The course of the products of combustion through the side flues H and the lower bottom flues I is indicated by the arrows 6 and 7 in Figs. 3, 6, and 9. The passage of the products of combustion through the flues F G H I heats the entire range thoroughly and evenly, and is the arrangement employed when the range is to be used for baking purposes.

I will now describe the course of the products of combustion when the range is to be used for boiling purposes, and does not require to be wholly heated. In this case the damper K is turned down, which closes the opening between the flues I and the rear chimney-flue J, and consequently prevents the passage of the products of combustion through the flues G H I, and causes them to pass from the lower ends of the flues F² F¹ F F¹ F² into the lower ends of the flues L² L¹ L L¹ L² in the outer rear flue-space. The products of combustion from the flues F² pass up through the flues L², down through the flues 1L², up through the flues 2L², down through the flues 3L², and up through the flues 4L², into the lateral flue L. The products of combustion from the flues F¹ pass up through the flues L¹, down through the flues 1L¹, up through the flues 2L¹, down through the flues 3L¹, and up through the flues 4L¹, into the lateral flue L. The products of combustion from the flue F pass up into the lateral flue L. From the lateral flue L the products of combustion pass into the upper part of the forward chimney-flue J', from the lower end of which they pass into the rear chimney-flue J. The damper K is operated by a rod, $k'$, that passes forward through the upper bottom flue-space, and out through the forward part of the side plate of the shell or case A. When turned up, the damper K sends the products of combustion through the flues F G H I, into the rear chimney-flue J, and when turned down it sends the products of combustion through the flues F L, and the forward chimney-flue J' into the rear chimney-flue J. M is a damper, which, when turned up, closes an opening leading from the space between the top plates of the cases or shells A B into the rear chimney-flue J, and when turned down opens said opening and closes the lower part of the rear chimney-flue J, preventing the products of combustion from passing through any of the flues F G H I L, and causing them to pass directly from the fire-box into the rear chimney-flue, thus producing a direct draft. The damper M is operated by a rod, $m'$, extending out through the top plate of the case A. N is a sliding damper placed in the upper part of the chimney-flue, to enable the draft of the range to be readily controlled, and which is operated by a rod, $n'$, extending out through the front of the chimney-flue, as shown in Figs. 2 and 6.

Having thus described my invention, what I claim as new, and desire to secure by Letters Patent, is—

1. The combination of the flues F G H I with each other and with the cases or shells A B of a range, and the chimney-flue J, substantially in the manner herein shown and described.

2. The combination of the damper K with the set of flues F G H I, the set of flues F L J', and the rear chimney-flue J, substantially as herein shown and described.

3. The combination of the damper M with the rear chimney-flue J, the set of flues F G H I, the set of flues F L J', and the opening leading into the space between the top plates of the cases A B of the range, substantially as herein shown and described.

EDWIN O. BRINCKERHOFF.

Witnesses:
JAMES T. GRAHAM,
T. B. MOSHER.